United States Patent Office 3,305,575
Patented Feb. 21, 1967

3,305,575
BENZANILIDE DERIVATIVES
Francois Debarre, Antony, Seine, France, assignor to Rhone-Poulenc S.A., Paris, France, a corporation of France
No Drawing. Filed Sept. 12, 1963, Ser. No. 308,364
Claims priority, application France, Sept. 19, 1962, 909,874; June 19, 1963, 938,633
13 Claims. (Cl. 260—454)

This invention relates to benzanilide derivatives.

The invention provides the new substituted benzanildes of the formula:

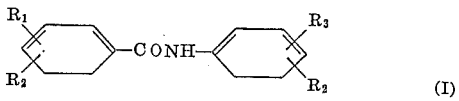
(I)

in which $R_1$, $R_2$, $R_3$, and $R_4$ each represent hydrogen, halogen, alkyl of up to 4 carbon atoms, hydroxy, nitro, or isothiocyanato at least one of $R_1$, $R_2$, $R_3$, and $R_4$ being isothiocyanato.

The compounds of Formula I possess interesting chemotherapeutic properties in human and veterinary medicine, and in partciular are anthelmintics which are especially active against the Cestoda, e.g. in sheep. Compounds containing one isothiocyanato group in each ring are especially preferred.

According to a feature of the invention, the compounds of Formula I are prepared by reacting thiophosgene with a compound of the formula:

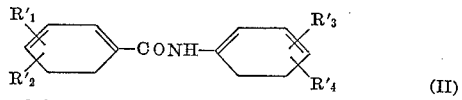
(II)

wherein $R'_1$, $R'_2$, $R'_3$ and $R'_4$ each represent hydrogen, halogen, alkyl of up to 4 carbon atoms, hydroxy, nitro or amino, at least one of $R'_1$, $R'_2$, $R'_3$ and $R'_4$ being amino, which is thus converted into isothiocyanato.

The reaction is preferably out in a diluent, e.g. an inorganic solvent such as dilute hydrochloric acid, an organic solvent such as a chlorinated hydrocarbon, for example chloroform, or an aqueous-organic solvent such as a mixture of water and chloroform, at a temperature between 0° and 40° C. in the presence or absence of an acid-binding agent, e.g. an alkali metal or alkaline earth metal derivative such as a carbonate, or a tertiary amine such as pyridine or triethylamine. The reaction is preferably effected in dilute hydrochloric acid in the absence of an acid-binding agent or in aqueous chloroform in the presence of calcium carbonate.

According to a further feature of the invention, the compounds of Formula I are prepared by reacting a benzoyl chloride of the formula:

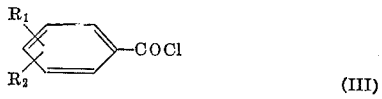
(III)

with an aniline of the formula:

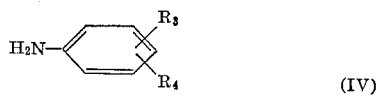
(IV)

in which $R_1$, $R_2$, $R_3$ and $R_4$ are as hereinbefore defined.

The reaction may be carried out with or without a solvent in the presence or absence of a condensing agent, but is preferably carried out at 40–80° C. in the presence of an acid-binding agent which is an alkali metal or derivative thereof such as a carbonate, or a tertiary amine such as pyridine or triethylamine. An organic solvent such as an aromatic hydrocarbon may be used as diluent.

The following examples illustrate the invention.

Example 1

Thiophosgene (25.3 g.) is added to a solution of 4,4'-diamino-benzanilide (22.7 g.) in normal hydrochloric acid (600 cc.) and the mixture stirred for 15 hours at 25° C. The precipitate which forms is filtered off, washed with normal hydrochloric acid (100 cc.) followed by water (200 cc.), and dried in vacuo at 25° C.

The crude product obtained is stirred for 2 hours with methylene chloride (2000 cc.) at laboratory temperature. Insoluble material is filtered off and the filtrate is concentrated by distillation at atmospheric pressure until crystallisation begins. After allowing the mixture to cool, the product is filtered off and washed with methylene chloride (40 cc.). 4,4'-diisothiocyanatobenzanilide (21 g.), M.P. 202° C., is obtained.

Example 2

Proceeding as in Example 1, but beginning with 3,3'-diamino-benzanilide (29.5 g.) and thiophosgene (32.9 g.), 3,3'-diisothiocyanatobenzanilide (17 g.), M.P. 170° C. is obtained.

Example 3

Proceeding as in Example 1, but beginning with 2'-chloro-4,4'-diaminobenzanilide (34 g.) and thiophosgene (32.9 g.), 2'-chloro-4,4'-diisothiocyanatobenzanilide (21 g.), M.P. 206° C., is obtained.

2'-chloro-4,4'-diaminobenzanilide, M.P. 192° C., is obtained by the reduction of 2'-chloro-4,4'-dinitrobenzanilide, M.P. 200° C. prepared from 4-nitrobenzoylchloride and 2-chloro-4-nitroaniline.

Example 4

Thiophosgene (234 g.) is added over 30 minutes to a solution of 3',4-diaminobenzanilide (216 g.) in normal hydrochloric acid (6 litres) and stirred for 16 hours at 25° C. The precipitate is filtered off, washed with water (4 litres), and dried at 50° C. under 25 mm. Hg pressure. The crude product thus obtained is stirred for 3 hours at 25° C. with methylene chloride (8 litres). Insoluble material is filtered off and the filtrate concentrated by distillation at atmospheric pressure until crystallisation begins. The mixture is allowed to cool and filtered, and the residue is washed with methylene chloride (300 cc.). 3',4-diisothiocyanatobenzanilide (170 g.), M.P. 163° C., is obtained.

Example 5

Thiophosgene (15.2 g.) is added slowly with stirring to a suspension of 3'-aminobenzanilide (25 g.) and calcium carbonate (13.2 g.) in water (650 cc.) and chloroform (650 cc.). The reaction is allowed to proceed for 16 hours at 25° C. The chloroform layer is then decanted, washed with water (200 cc.) and dried over anhydrous sodium sulphate. After filtration, the solvent is evaporated by distillation under reduced pressure (25 mm. Hg), and the residue is recrystallised from ethylacetate, to give 3'-isothiocyanatobenzanilide (20.1 g.), M.P. 141° C.

Example 6

Proceeding as in Example 5, but starting from 3-aminobenzanilide (32 g.), calcium carbonate (16.9 g.), and thiophosgene (25 g.), 3-isothiocyanatobenzanilide (30.6 g.), M.P. 160° C., is obtained.

Example 7

Proceeding as in Example 4, but starting from 3,4'-diamino benzanilide (24 g.), and thiophosgene (26.8 g.), 3,4-diisothiocyanatobenzanilide (12.4 g.), is obtained, M.P. 170° C. with resolidification and remelting at 177–178° C.

Example 8

Proceeding as in Example 5, but starting from 2',5-dichloro-2-hydroxy-4'-aminobenzanilide (32 g.), calcium carbonate (14.1 g.), and thiophosgene (16.5 g.), 2',5-dichloro-2-hydroxy-4'-isothiocyanatobenzanilide (10 g.), M.P. 220° C. is obtained.

Example 9

Proceeding as in Example 4, but starting from 3',4-diamino-4'-chlorobenzanilide (60 g.) and thiophosgene (59 g.), 4'-chloro-3',4-diisothiocyanatobenzanilide (7.9 g.), M.P. 146° C. is obtained.

Example 10

Proceeding as in Example 4, but starting from 3',4-diamino-4'-methylbenzanilide (48.2 g.) and thiophosgene (50.6 g.), 4' - methyl - 3',4 - diisothiocyanatobenzanilide (31.4 g.), M.P. 170° C. is obtained.

Example 11

Proceeding as in Example 4, but starting from 3'-amino-2-hydroxy-benzanilide (30 g.) and thiophosgene (16.5 g.), 2-hydroxy-3'-isothiocyanatobenzanilide (25.5 g.), M.P. 176° C. is obtained.

The invention includes within its scope pharmaceutical (including veterinary) compositions comprising at least one substituted benzanilide of Formula I in association with a pharmaceutical carrier. Compositions for oral administration, especially tablets, pills, and capsules, are preferred.

Solid compositions for oral administration include compressed tablets and pills as well as dispersible powders and granules. In such solid compositions one or more of the substituted benzanilides is or are admixed with at least one inert diluent such as calcium carbonate, potato starch, alginic acid, sucrose or lactose. The compositions may also comprise, as is normal practice, additional substances other than inert diluents e.g. lubricating agents such as magnesium stearate.

Capsules for oral administration consist of one or more of the substituted benzanilides, with or without the addition of diluents or excipients, enclosed in a capsule of absorbable material such as gelatin or cellulose acetophthalate.

Liquid composition for oral administration include pharmaceutically acceptable emulsions, solutions, suspension, syrups, and elixirs containing inert diluents commonly used in the art such as water and liquid paraffin. Such compositions may also comprise adjuvants such as wetting and suspending agents, and stabilizing, preserving, perfuming, flavouring, and sweetening agents.

The percentage of active ingredient in the compositions of the invention may be varied, it only being necessary that a suitable dose of the said ingredient should be conveniently administered.

The effective dose of the substituted benzanilide of Formula I will ordinarily be determined by trial. For example, 3',4 - diisothiocyanatobenzanilide is active in a dose of 50 mg./kg. when administered orally to sheep.

I claim:

1. A compound of the formula:

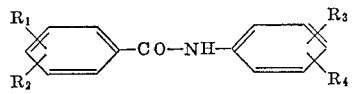

in which $R_1$, $R_2$, $R_3$, and $R_4$ are each selected from the class consisting of hydrogen, chlorine, alkyl of up to 4 carbon atoms, hydroxy, nitro, and isothiocyanato, at least one of $R_1$, $R_2$, $R_3$, and $R_4$ being isothiocyanato.

2. A compound of the formula:

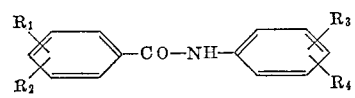

in which $R_1$, $R_2$, $R_3$, and $R_4$ are each selected from the class consisting of hydrogen, chlorine, alkyl of up to 4 carbon atoms, hydroxy, nitro, and isothiocyanato, at least one of $R_1$ and $R_2$ and of $R_3$ and $R_4$ being isothiocyanato.

3. 4,4'-diisothiocyanatobenzanilide.
4. 3,3'-diisothiocyanatobenzanilide.
5. 2'-chloro-4,4'-diisothiocyanatobenzanilide.
6. 3,4'-diisothiocyanatobenzanilide.
7. 3'-isothiocyanatobenzanilide.
8. 3-isothiocyanatobenzanilide.
9. 3,4'-diisothiocyanatobenzanilide.
10. 2',5-dichloro - 2 - hydroxy - 4' - isothiocyanatobenzanilide.
11. 4'-chloro-3',4-diisothiocyanatobenzanilide.
12. 4'-methyl-3',4-diisothiocyanatobenzanilide.
13. 2-hydroxy-3'-isothiocyanatobenzanilide.

References Cited by the Examiner

UNITED STATES PATENTS

| | | | |
|---|---|---|---|
| 2,894,013 | 7/1959 | Werres | 260—454 |
| 2,943,106 | 6/1960 | McKay et al. | 260—454 |
| 2,965,537 | 12/1960 | Rosen | 167—30 |
| 3,014,837 | 12/1961 | Huisman et al. | 167—30 |

CHARLES B. PARKER, *Primary Examiner.*

D. R. MAHANAND, *Assistant Examiner.*